(12) United States Patent
Kaeb et al.

(10) Patent No.: US 10,194,577 B2
(45) Date of Patent: Feb. 5, 2019

(54) RAPID CLEANOUT MIXING DRUM WITH MULTIPLE FUNCTIONAL ZONES

(71) Applicant: KSi Conveyor, Inc., Sabetha, KS (US)

(72) Inventors: Terry N Kaeb, Hoopeston, KS (US); Paul Arthur Kaeb, Sabetha, KS (US); Todd William Kaeb, Cissna Park, IL (US)

(73) Assignee: KSI Conveyor, Inc., Sabetha, KS (US)

( * ) Notice: Subject to any disclaimer, the term of this patent is extended or adjusted under 35 U.S.C. 154(b) by 632 days.

(21) Appl. No.: 14/301,404

(22) Filed: Jun. 11, 2014

(65) Prior Publication Data

US 2014/0373381 A1    Dec. 25, 2014

Related U.S. Application Data

(60) Provisional application No. 61/838,246, filed on Jun. 22, 2013.

(51) Int. Cl.

| F26B 25/06 | (2006.01) |
|---|---|
| A01C 1/00 | (2006.01) |
| F26B 25/16 | (2006.01) |
| F26B 11/02 | (2006.01) |
| F26B 11/04 | (2006.01) |

(52) U.S. Cl.
CPC ............... *A01C 1/00* (2013.01); *F26B 11/02* (2013.01); *F26B 11/0409* (2013.01); *F26B 11/0477* (2013.01); *F26B 25/16* (2013.01)

(58) Field of Classification Search
CPC ... A01C 1/00; A01C 1/06; F26B 25/16; F26B 17/18; F26B 17/20; F26B 17/205; F26B 11/02; F26B 11/04; F26B 11/0404; F26B 11/0409; F26B 11/0436; F26B 11/0477; F26B 2200/06; F26B 2200/08
USPC ............... 34/231, 109, 311, 127, 126, 202, 34/209–211, 217, 218, 227, 130, 198, 34/129, 142; 414/332; 366/225, 226, 366/229
See application file for complete search history.

(56) References Cited

U.S. PATENT DOCUMENTS

| 3,780,447 | A | * | 12/1973 | Fales | F26B 11/0463 34/136 |
|---|---|---|---|---|---|
| 3,946,996 | A | * | 3/1976 | Gergely | B01F 7/027 209/389 |
| 4,071,962 | A | * | 2/1978 | Saeman | F26B 11/0477 34/135 |
| 4,108,932 | A | * | 8/1978 | Takewell | B01J 2/12 264/117 |
| 4,383,379 | A |   | 5/1983 | Avril | |
| 4,543,180 | A | * | 9/1985 | Riker | B03B 5/42 209/11 |

(Continued)

OTHER PUBLICATIONS

VALMETAL Tumbler / Mixer, Printed in Canada 2005, EM Communication Inc.

*Primary Examiner* — John McCormack
(74) *Attorney, Agent, or Firm* — Daniel J. Coughlin; Coughlin Law Office LLC

(57) ABSTRACT

A horizontal rotating drum for mixing and drying treated seed with multiple functional zones separated by one or more dams that are attached to and rotate with the drum. The dam regulates the flow of seed through the drum's functional zones. The dam has one or more cleanout passages and an overflow passage centrally disposed within the dam to selectively regulate seed flow.

14 Claims, 8 Drawing Sheets

(56) References Cited

U.S. PATENT DOCUMENTS

| | | | |
|---|---|---|---|
| 6,584,699 B2 | 7/2003 | Ronning | |
| 6,960,361 B2 | 11/2005 | Chisholm | |
| 2006/0192024 A1* | 8/2006 | Wysong | A62C 27/00 239/8 |
| 2010/0199559 A1* | 8/2010 | Hallett | B01J 4/005 48/127.7 |
| 2010/0242838 A1* | 9/2010 | Fukumori | A23P 20/12 118/58 |
| 2010/0323588 A1* | 12/2010 | Benson | B24C 9/006 451/87 |

* cited by examiner

RAPID CLEANOUT MIXING DRUM WITH MULTIPLE FUNCTIONAL ZONES

CROSS-REFERENCES

This application claims the benefit of U.S. Provisional Application No. 61/838,246, filed Jun. 22, 2013.

GOVERNMENT RIGHTS

Not Applicable.

REFERENCE TO CDS

Not Applicable.

FIELD

The present invention is in the technical field of treating seeds.

BACKGROUND

Agricultural seeds are often treated with insecticides, fungicides, inoculants, and other compositions immediately before planting. The time window for planting—when the weather is warm enough and the fields are dry—is often very short. This means the seed dealer must quickly treat and deliver a high volume of seed to farmers who are ready to plant their fields. These seed treatments are commonly applied by spraying a liquid composition to the surface of seed, which requires a smaller quantity of seed treatment composition than the traditional field application of treatment fluids.

The last stage of treating seeds involves placing the wet, freshly treated seed in a rotating drum that mixes the treated seed, evenly distributes the treatment coat, and allows the treatment solution to dry. Seed progresses through the rotating drum in three phases: initial seed aggregation, mixing/drying, and cleanout. The initial seed aggregation phase is when wet, partially covered seed begins to enter the drum. The seed accumulates in the interior of the drum to form a seed aggregate in the bottom of the drum. During the mixing/drying phase the drum operates in steady state with seed entering through the inlet and discharging through the discharge end. The interior of the rotating drum lifts the seed up the side of the drum thereby mixing and distributing treatment across the surface of the individual seed. During the cleanout phase, no new seed enters the rotating drum. The drum is generally tilted, allowing gravity to encourage the seed for discharging at the discharge end.

SUMMARY

We recognized that a horizontal mixing drum for mixing and drying seed could mix, dry, and discharge seed more efficiently if the drum could selectively retain seed in separate zones that are optimized for mixing, drying, or discharge while providing passages for rapid seed cleanout. The wet seed would enter the hollow, elongated chamber of the horizontal rotating drum through a hole in the inlet end. That seed accumulates in the interior of the drum to form an aggregate of the seed in the bottom of the drum.

A dam separates the drum into separate zones. The outside periphery of dam is attached to the interior of the drum so the dam rotates along with the drum. Generally, the dam slows the progression of the wet, freshly treated seed through the drum. The dam has at least two types of passages to selectively allow the seed to progress towards the discharge end of the drum.

The first type of passage is the cleanout passage, which is a hole in the dam located at the outside edge of the dam and adjacent to the interior surface of the drum. The cleanout passages allow a portion of the seed that is close to the interior surface of the drum to progress past the dam.

The second type of passage is the overflow passage. The overflow passage is a hole that is centrally located in the dam that prevents an excessive quantity of seed from accumulating in the upstream functional zone. The overflow passage allows the portion of the aggregate that accumulates to the height of the overflow passage to progress toward the discharge end.

Between the apertures is the impermeable, retaining portion of the dam. The retaining portion of the dam slows the progression of the seed through the mixing and/or drying zones and directs the seed through either the cleanout passage or the overflow passage.

The dam separates the interior of the drum into zones. The inlet of the drum is the mixing zone. Wet, freshly treated seed enters the mixing zone through the inlet end of the drum. As the seed continues to flow into the drum, the seed forms an aggregate at the bottom of the drum. This seed is then lifted and mixed as the drum rotates. The mixing zone could use flights designed to aggressively mix the wet seed together, spreading the treatment fluid over the surface of the seed.

The seed then progresses toward the discharge end through either the cleanout passages or the overflow passage. A second dam could separate a distinct drying zone between the mixing zone and the discharge end. The drying zone could use flights designed to lift the seed more gently than the mixing flights. These drying flights would continue to expose the seed to the air to facilitate drying, but would not mix the seed as aggressively to avoid damaging the fragile seed. The second dam could also selectively retain seed in the drying zone prior to discharge.

It could also be important to prevent the initial deposit of seed from progressing through the drum too quickly. Delaying or ramping up the initial drum rotation speed could slow the progression of the initial seed deposit. The drum should not reach full rotation speed until the height of the seed aggregate has reached or surpassed the height of the cleanout aperture.

Some advantages of the present invention include an apparatus which provides:
a. efficient mixing and drying of seed treated with a fluid seed treatment;
b. rapid clean out of seed, reducing the overall treatment time;
c. a rotating drum for mixing and drying seed with two or more internal zones optimized for mixing, drying, and/or discharging seed;
d. a dam for selectively retaining seed within the internal drum zones; and
e. a control system for delaying or ramping the speed of drum rotation during the initial deposit of seed into the drum.

BRIEF DESCRIPTION OF DRAWINGS

Aspects are illustrated by way of example, and not by way of limitation, in the accompanying drawings, wherein.

DETAILED DESCRIPTION

Figure 1:
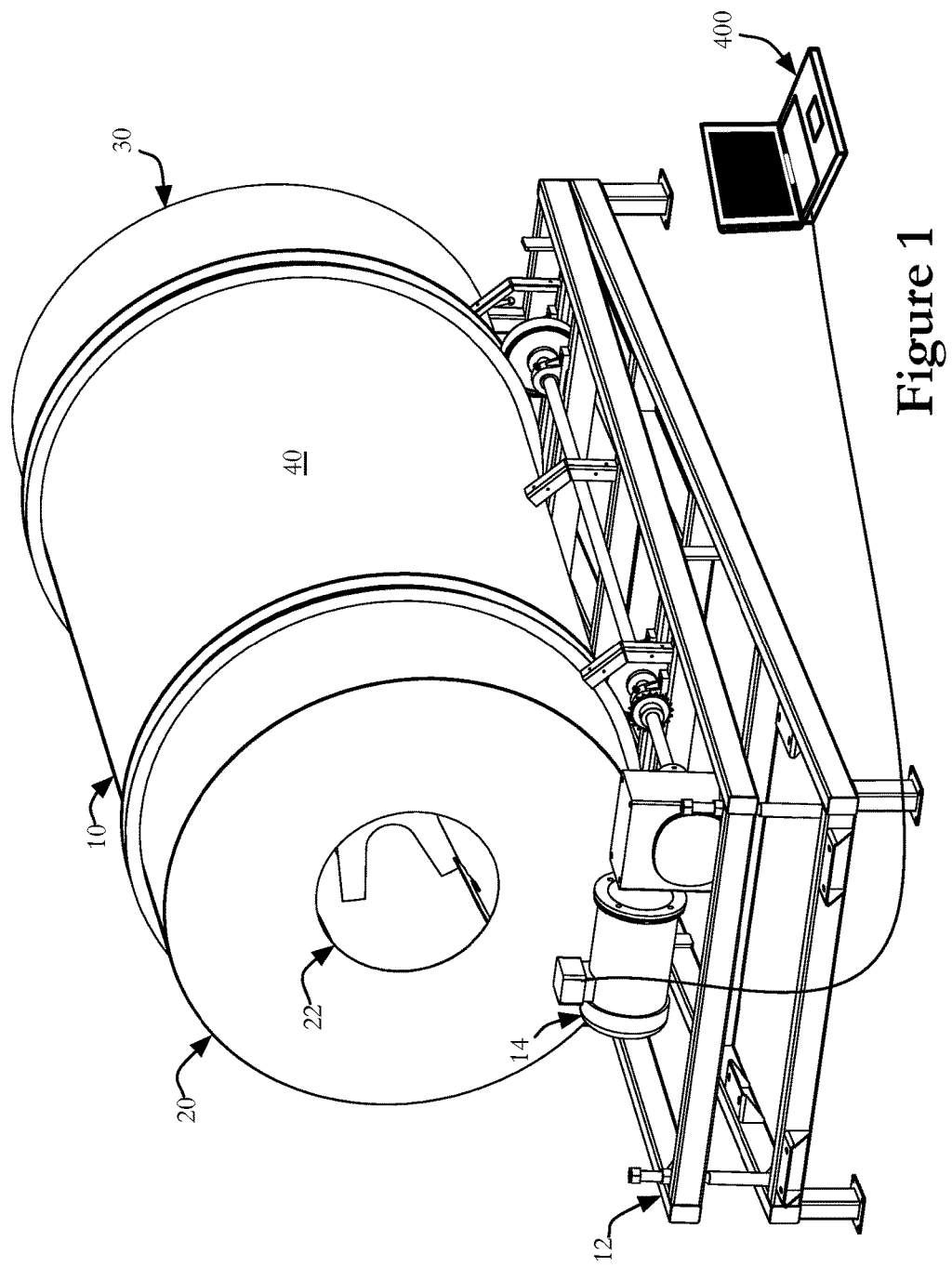
FIG. 1 is a perspective view of the exterior of the inlet end of the rotating drum.
Figure 2:
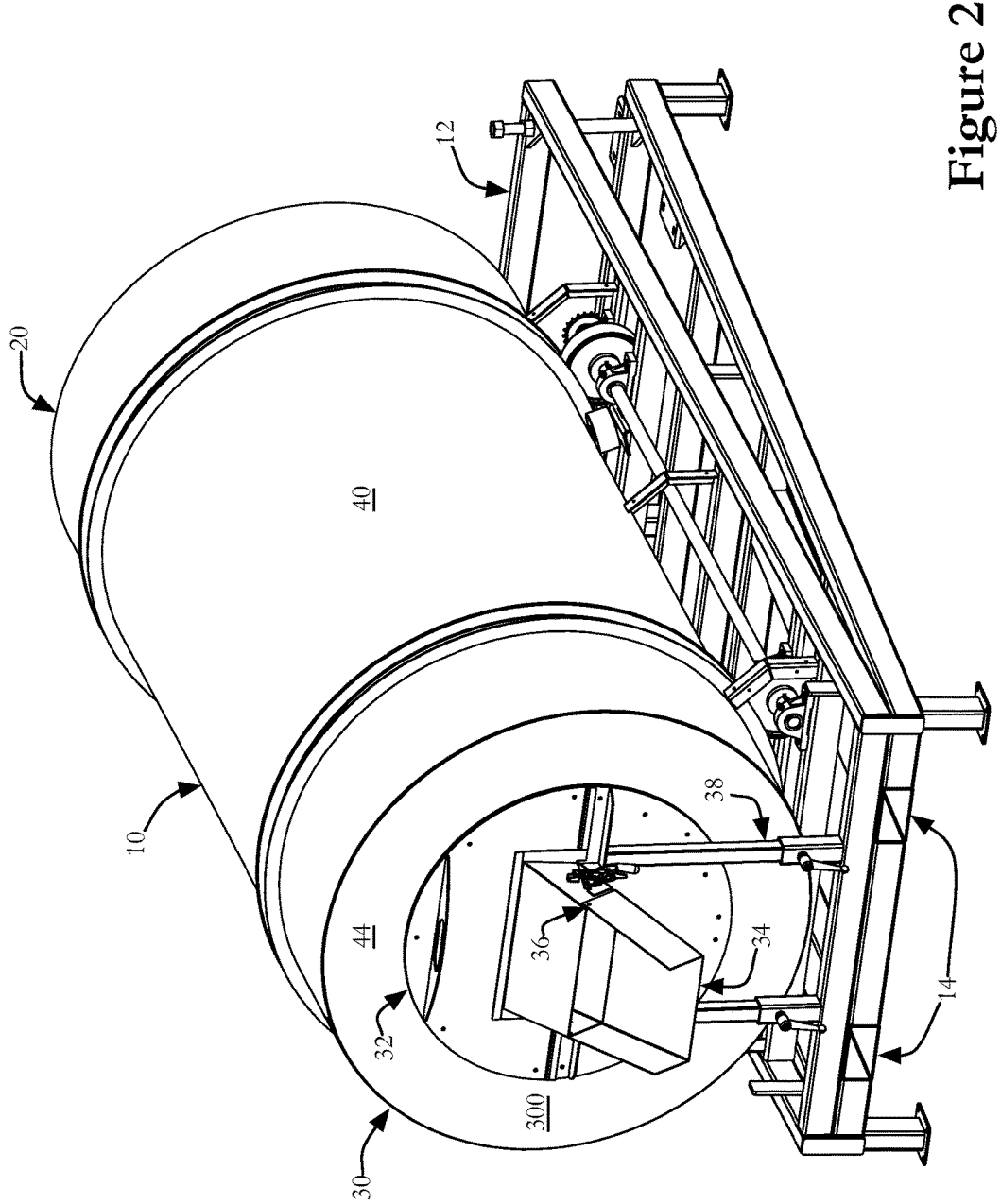
FIG. 2 is a perspective view of the exterior of the discharge end of the rotating drum.

Referring now to the invention in more detail, in FIGS. 1 and 2 there is shown the exterior of the drum 10. Freshly treated seed enters the drum 10 through the inlet opening 22 in the inlet end 20. The seed is mixed within the drum 10 as the motor 14 causes the drum 10 to rotate on the drum frame 12. The dry, mixed seed is discharged through the discharge opening 32 in the discharge end 30. Seed progresses from the inlet end 20 to the discharge end 30 under the force of gravity, as the inlet end 20 is elevated relative to the discharge end 30. As will be described in greater detail below, the flights within the drum 10 cause the seed to be lifted and deposited on the chute 34. The chute 34 is inserted into the drum through the discharge opening 32. The chute 34 directs the seed from inside the drum 10 to a discharge conveyor (not shown).

Figure 3:
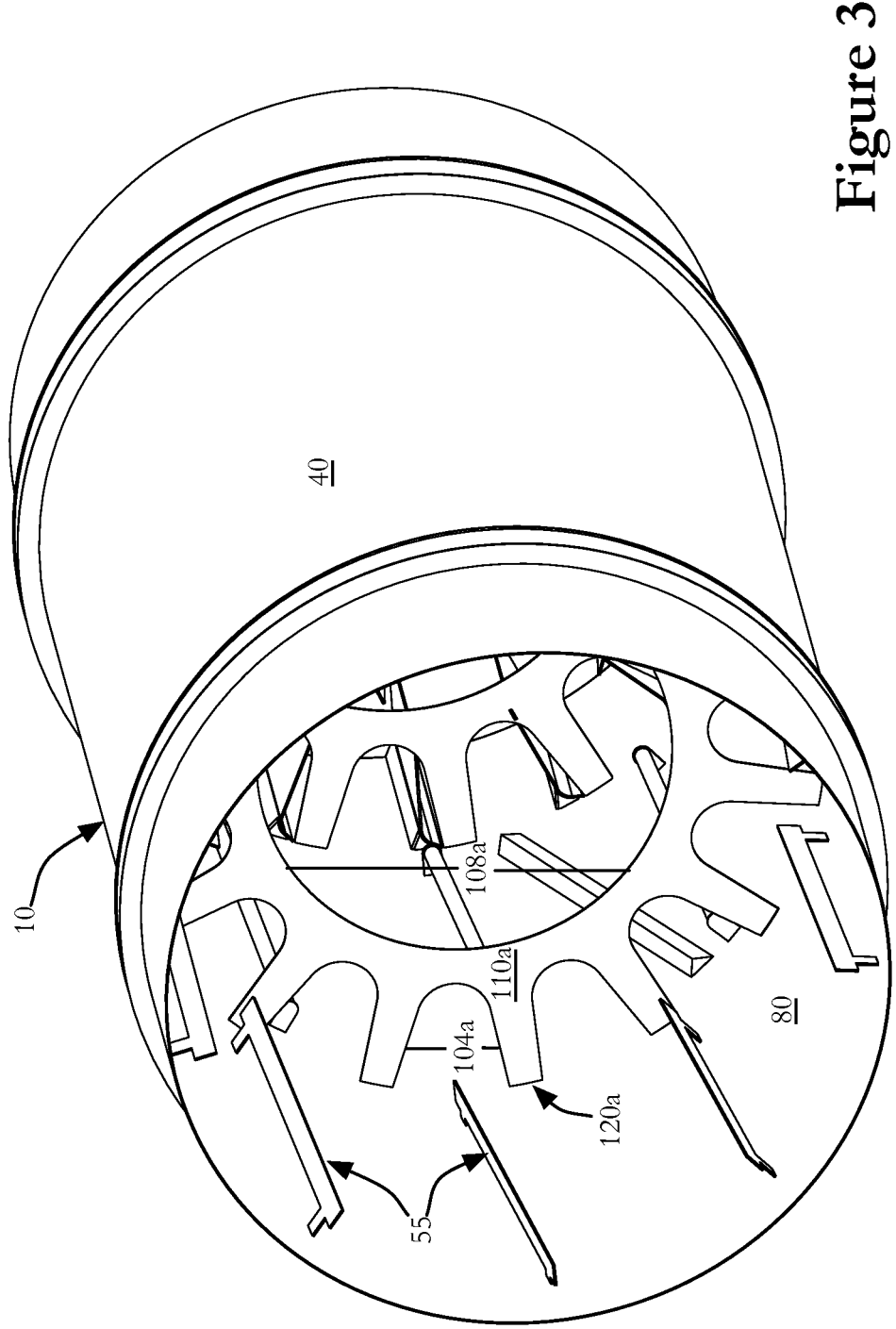
FIG. 3 is a perspective view of the inlet end of the rotating drum with the inlet end wall removed.
Figure 4:
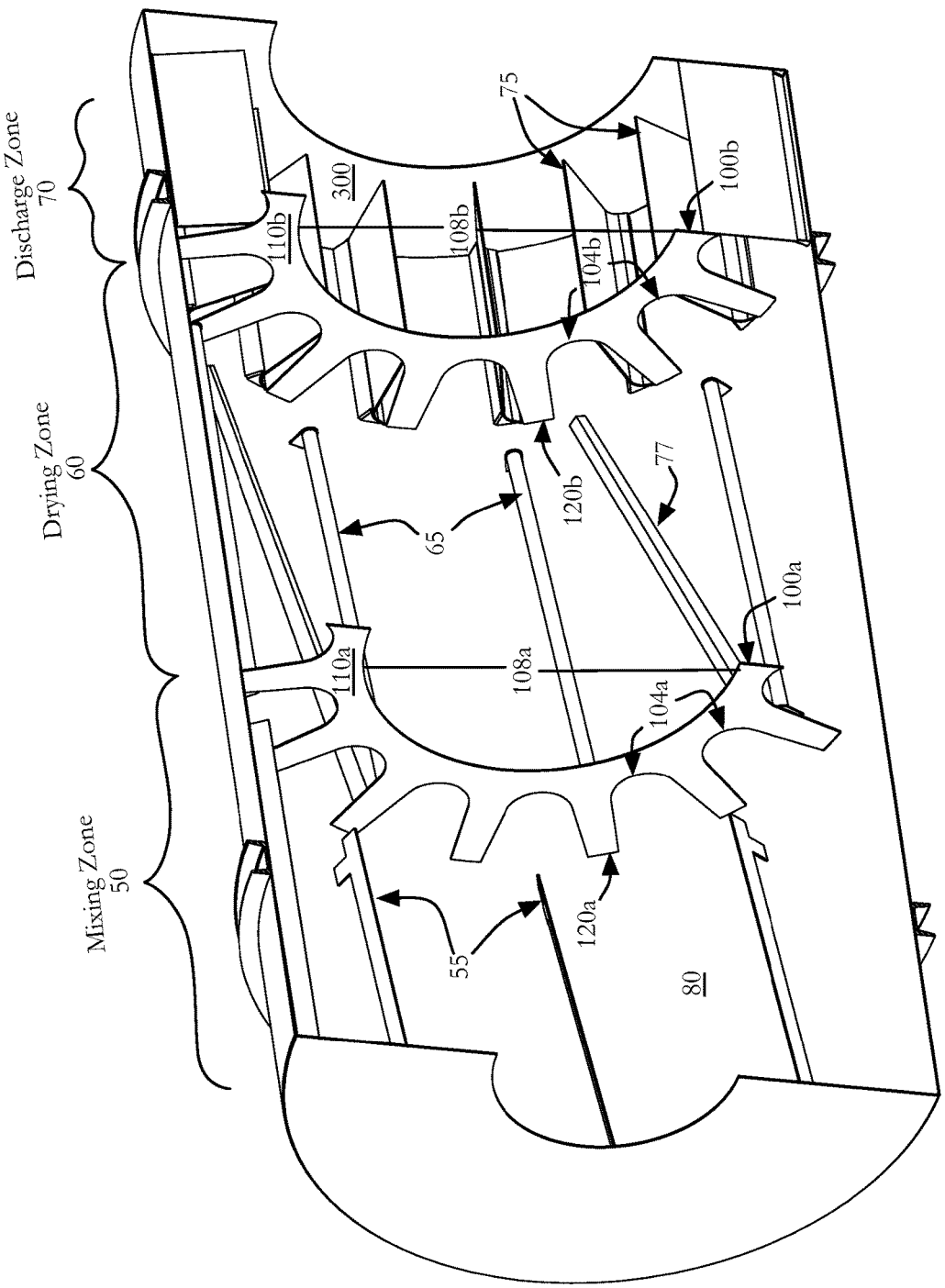
FIG. 4 is a cut-away view of the interior of the rotating drum highlighting the functional zones separated by the first and second dams.

During the initial seed aggregation phase, the seed enters the drum and begins to form a seed aggregate on the bottom of the interior surface 80 of the drum 10. The interior of the drum 10 is depicted in FIGS. 3 and 4. As illustrated, two dams 100a,b separate the drum into separate functional zones: a mixing zone 50, a drying zone 60, and a discharge zone 70. The outside periphery 120a,b of the dams 100a,b are attached to the interior surface 80 of the drum 10 so that they rotate along with the drum. Generally, the dams 100a,b slow the progression of the wet, freshly treated seed through the drum 10. The dams 100a,b have at least two types of passages to selectively allow the seed to progress towards the discharge end of the drum.

The outside periphery 120a of the first dam 100a has at least one peripheral aperture that defines a cleanout passage 104a through the first dam 100a. The cleanout passage 104a is adjacent to the interior surface 80 of the drum 10. The cleanout passage 104a allows the portion of the aggregate that is shorter than the peripheral apertures—seed that is close to the interior surface 80 of the drum 10—to progress past the first dam 100a. The cleanout passages 104a allow the drum to go through the cleanout phase quickly and eliminates the need for reversing the rotation direction.

There is also a central aperture that creates an overflow passage 108a within the first dam 100a that prevents an excessive quantity of seed from accumulating in the drum. The overflow passage 108a allows the portion of the seed aggregate that accumulates to the height of the overflow passage to progress through a central portion of the drum and toward the discharge end 30 of the drum 10.

Between the apertures is the retaining portion 110a,b of the dams 100a,b. The retaining portion 110a,b slows the progression of the seed through drum 10, thus retaining the seed toward the inlet end 20. The progression of the seed aggregate is limited by the retaining portion 110a,b when a portion of the seed aggregate is restricted and forced to flow through either the cleanout passage 104 or the overflow passage 108. The retaining portion 110a retains the seed aggregate toward the inlet end 20, thereby retaining the seed aggregate until the seed is thoroughly mixed and the treatment solution is evenly spread over the seed surface.

The dams also separate the interior of the drum 10 into multiple zones. The first dam 110a separates the inlet end of the drum into a mixing zone 50. The mixing zone 50 is configured with a plurality of mixing flights 55 that are attached to the interior surface 80 of the drum. As wet, freshly treated seed enters the drum and accumulates into a seed aggregate near the inlet end 20, the mixing flights 55 rotate and move through the seed aggregate. The mixing flights 55 engage a portion of the seed aggregate, lifting and mixing seed as the drum 10 rotates. The mixing flights 55 are equally spaced about the circumference of the interior surface 80 of the drum 10. The mixing flights 55 extend approximately perpendicularly from the interior surface 80 of the drum 10 in order to facilitate mixing.

The retaining portion 110a of the first dam 100a slows the progression of the seed aggregate, thereby retaining seed in the mixing zone 50. The increased retention time in the mixing zone 50 ensures that the wet, freshly treated seed is thoroughly mixed prior to progressing toward the discharge end. This efficient mixing is particularly important for the initial deposit of seed, as the initial seed that is discharged from existing treaters is generally unevenly covered with the treatment solution. As the seed aggregate grows, the mixing and distribution of treatment over the surface of the seed becomes more efficient. As the drum continues to rotate, a portion of the seed aggregate progresses toward the discharge end 30 through either the cleanout passages 104 or the overflow passage 108.

A second dam 100b could separate a distinct drying zone 60 between the mixing zone 50 and the discharge end 70. The drying zone 60 uses drying flights 65 designed to lift the seed more gently than the mixing flights 55. These drying flights 65 would continue to expose the seed to the air to facilitate drying, but would not mix the seed as aggressively to avoid damaging the fragile seed.

The second dam 100b selectively retains seed in the drying zone prior to discharge. The second dam 100b is configured with one or more cleanout passages 104b, an overflow passage 108b, and a retaining portion 110b as described above. The size and shape of the retaining portion 110b of the second dam 100b could be similar to the retaining portion 110a of the first dam 100a. However, the retaining portion 110b of the second dam 100b may be optimized to retain seed in the drying zone longer—requiring the cleanout passages 104b and the overflow passage 108b to be smaller. Alternatively, the retaining portion 110b of the second dam 100b may be optimized to retain seed in the drying zone for a shorter amount of time—requiring the cleanout passages 104b or the overflow passage 108b to be larger.

As the drum continues to rotate, a portion of the seed aggregate progresses into the discharge zone 70 through either the cleanout passages 104b or the overflow passage 108b of the second dam 100b. The incline of the inlet end 20 of the drum 10 propels the seed toward the discharge end 30 of the drum. The discharge end wall 300 retains the seeds, causing the seed to accumulate at the discharge end of the drum. Once accumulated at the discharge end, the seed is engaged by the discharge flights 75. The discharge zone 70 is configured with a plurality of discharge flights 75. The discharge flights 75 are equally spaced about the interior surface 80 at the discharge end 30 of the drum 10. The discharge flights 75 extend approximately perpendicularly from the interior surface 80 of the drum 10. This allows the discharge flights 75 to elevate seed independent of the rotation direction.

The discharge flights 75 move through and engage a portion of the aggregated seed. The rotation of the discharge flights 75 causes the seed to be lifted. As the drum rotates, the discharge flights support the seed, elevating and lifting the seed onto the chute 34. The discharge flights 75 lift the seed differently than the mixing flights 55 or drying flights 65. The discharge flights 75 lift and carry the seed as the drum rotates and deposit the seed onto the chute 34.

The chute 34 is partially inserted into the discharge opening 32. The chute 34 can be inserted into the drum 10 as far as the discharge lifting flights extend into the drum so that all of the seed that is lifted and carried may be deposited on the chute. The chute 34 is positioned at an incline so that seed falls on the chute within the drum and gravity encourages the seed to travel downward, outside the drum, and then onto a discharge conveyor (not shown). The elevated discharge chute eliminates the need to elevate the horizontal rotating drum on a raised frame, while still allowing the drum to discharge into a conveyor hopper.

The motor 14 that rotates the drum is connected to a control system 400. The control system 400 could control and monitor the speed and direction of drum rotation. The control system 400 could also monitors and controls other components of the treater system such as: seed conveyors, scaling and metering equipment, seed treatment applicators, and seed sensors. In order to prevent the initial deposit of seed from progressing through the drum too quickly, the control system 400 could delay or ramp the initial drum rotation speed from no rotation up to full operating speed. By ramp, we mean that the control system would initially turn the drum slowly and then gradually increase the drum rotation speed as seed enters the drum. The control system 400 could regulate the drum rotation speed until a sufficiently large seed aggregate has formed in the mixing zone 50. The seed aggregate is sufficiently large when the mixing flights 55 will engage the seed aggregate and adequately mix the seed. In one configuration, the control system 400 will regulate the motor 14 such that the drum does not reach full rotation speed until the height of the seed aggregate has reached or surpassed the height of the retaining portion 110 of the dam 100. In another configuration, the control system 400 will regulate the motor such that the drum does not reach full rotation speed until a sufficient quantity of seed is present in the drum to form a seed aggregate that mixes and distributes treatment composition efficiently.

FIGS. 3 and 4 depict the mixing flights 55 in the mixing zone 50 of the drum 10. The mixing flights 55 are illustrated as flat bars that are lifted away from the interior surface 80. The mixing flights 55 are configured as flat bars to aggressively mix the wet, freshly treated seed. The flat bars make contact with the seed aggregate across the entire surface area of the bar, dragging a portion of the seed upward as the drum rotates. This seed cascades back down into the seed aggregate, thereby mixing and distributing the treatment composition across the surface of the seed. The mixing flights 55 are lifted away from the interior of the drum in order engage the accumulated seed aggregate. The gap between the mixing flights 55 and the interior surface 80 also allows seed to cleanout at the end of the mixing, drying cycle without seed sticking to the seam between the flight and the interior surface 80. However, it is also possible for the mixing flights 55 to be flat, rounded, or directly attached to the interior surface 80 of the drum 10 and still effectuate proper mixing in the mixing zone 50.

The mixing flights 55 can be positioned are varying heights, with some mixing flights raised higher off of the interior surface 80 of the drum than other mixing flights. As seed is introduced into the mixing zone 50, the seed aggregate will start small and begin to grow—depending on the rate at which seed is introduced into the mixing zone. The lower mixing flights will engage a smaller seed aggregate that forms initially. As the flow rate continues, the seed aggregate will increase in size. As the seed aggregate grows, the higher mixing flights will begin to engage the seed aggregate while the lower mixing flights continue to engage the seed aggregate. The higher mixing flights will ensure that the entire seed aggregate is mixed. At low flow rates, the seed aggregate may not grow to reach the higher mixing flights, and therefore the lower mixing flights are needed to engage and mix the treated seed. By including both the lower and higher mixing flights, the mixing zone will engage and mix the seed aggregate at both high and low flow rates.

FIGS. 3 and 4 depict the drying flights 65 in the drying zone 60 of the drum 10. The drying flights 65 are illustrated as round bars that are lifted away from the interior surface 80. The drying flights 65 are configured as round bars to continuously lift the seed along the interior surface 80 of the drum 10. The rounded bars engage the seed more gently than the flat bars used for the mixing flights 55, which decreases damage to the seed. The drying flights 65 are lifted away from the interior of the drum in order to engage the accumulated seed aggregate. The gap between the drying flights 65 and the interior surface 80 also allows seed to cleanout at the end of the mixing, drying cycle without seed sticking to the flight-interior surface seam. However, it is also possible for the drying flights 65 to be flat, rounded, or directly attached to the interior surface 80 of the drum 10 and still effectuate proper drying in the drying zone 50.

As described above, lifting the mixing flights 55 and drying flights 65 above the interior surface 80 limits the potential for seed to stick (or adhere) to the seams between the flight and the drum. However, the discharge flights 75 cannot be lifted off the interior surface 80 as they provide cleanout and lift for the entire quantity of seed. The portion of the discharge flights 75 that makes contact with the interior surface 80 can be sloped, thereby providing lower surface area contact between the seed and the discharge flight 75 and the interior surface 80.

In order to achieve complete and rapid discharge of the seed, the drying zone 60 can include cleanout flights 77. The cleanout flights are attached directly to the interior surface 80 of the drum. The cleanout flights 77 do not have any space or gap underneath. As a result, the cleanout flights engage the lowest portion of the seed aggregate. The cleanout flights 77 will continue to engage a seed aggregate that is only a single layer of seed. The purpose of the cleanout flights 77 is to engage the lowest level of the seed aggregate and encourage that level of the seed aggregate toward the discharge zone 70. The cleanout flights 77 are attached to the interior surface and extend longitudinally within the drum. While generally longitudinal, the cleanout flights 77 could be straight, angled, or helical. The cleanout flights 77 have a peak, so that the cross section of a cleanout flight is triangular or a semi-circular. The cleanout flights 77 extend longitudinally through the drying zone and can extend all the way to the cleanout passage 104*b* in the dam 100*b*.

FIGS. 5-8 detail the flow of seed through various phases of the mixing and drying cycle. In each of the diagrams, the solid lines indicate an active step in the process and a dotted line indicates an inactive step.

Figure 5:
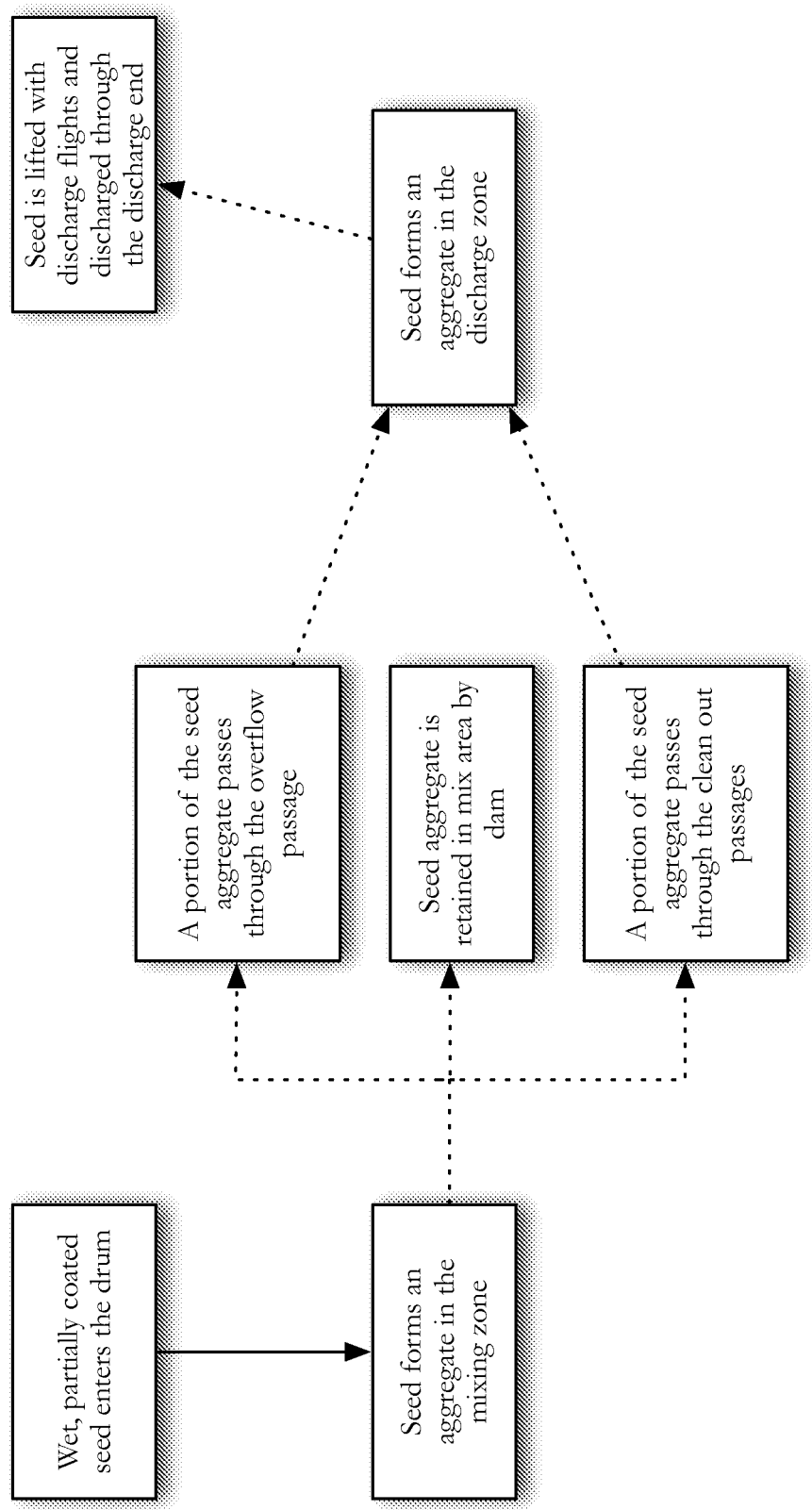
FIG. 5 is a flow chart depicting the progression of seed through the rotating drum during the initial seed aggregation phase.

FIG. 5 depicts the first phase, the Initial Seed Aggregation Phase. Wet, partially coated seed enters the drum from the seed treatment applicator. As the seed enters, a seed aggregate forms in the inlet end 20 of the drum 10. Generally, the initial seed aggregate does not mix well until a sufficient seed aggregate is formed. In order to maximize the amount of time the initial seed aggregate remains in the mixing zone 50, the control system 400 can control the rotation of the drum to delay or ramp the drum rotation. As shown, the seed does not yet progress through the dam in the initial seed aggregation phase.

Figure 6:
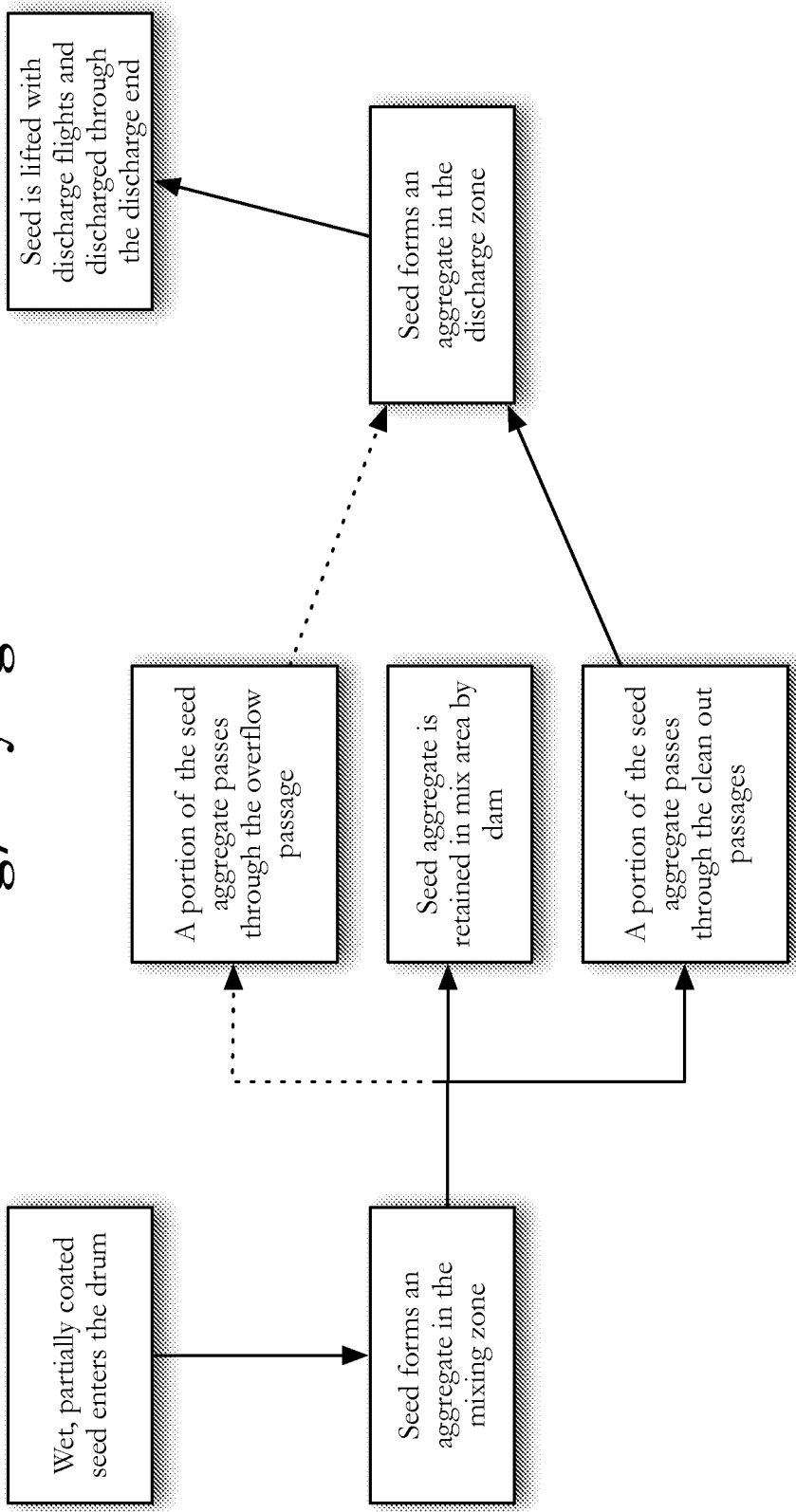
FIG. 6 is a flow chart depicting the progression of seed through the rotating drum during the mixing/drying phase.

FIG. 6 depicts the Mixing/Drying Phase. As the aggregate forms and—optionally, the control system 400 causes the drum to rotate at normal operating speeds—the seed aggregate is mixed in the mixing zone 50. A portion of the seed aggregate passes through the clean out passages 104. However, at this stage the seed aggregate has not grown sufficiently to reach the overflow passages 108. This seed begins to accumulate and form a seed aggregate in the discharge zone. A portion of the seed aggregate in the discharge end is engaged by the discharge flights 75. The discharge flights 75 lift and deposit the seed on the chute 34, thereby discharging the seed from the drum 10.

Figure 7:
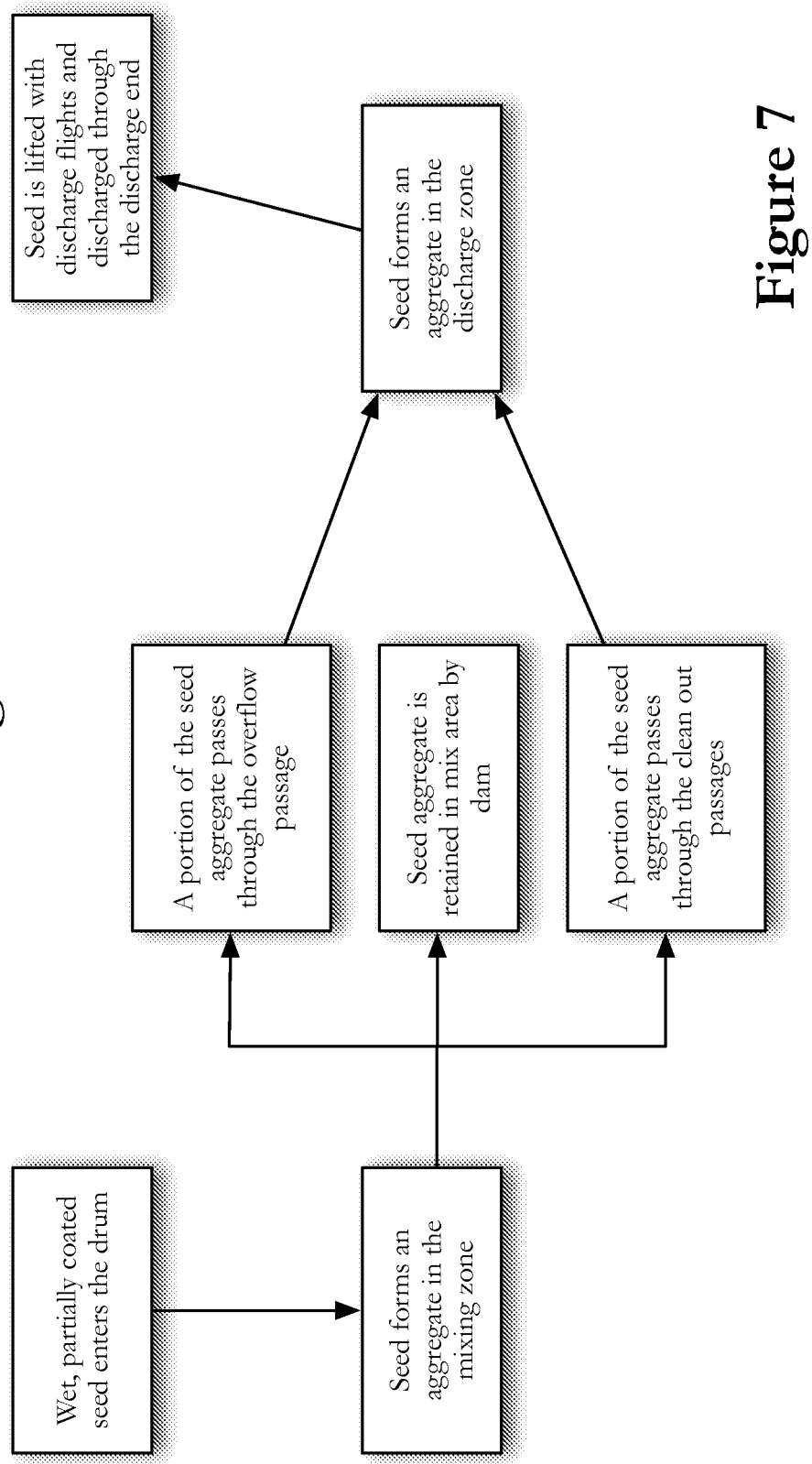
FIG. 7 is a flow chart depicting the progression of seed through the rotating drum during overflow progression.

FIG. 7 depicts the Overflow Progression. As the seed aggregate grows, the mixing and drying process is more efficient. Therefore, minimum retention time is preferred. The overflow passage 108 allows seed in the larger seed aggregate to progress toward the discharge end 30. During this phase, seed passes through both the cleanout passages 104 and the overflow passages 108. A portion of the seed aggregate is retained by the retaining portion 110 of the dam 100. However, by utilizing both the cleanout passages 104 and the overflow passages 108, a larger portion of the seed aggregate is allowed to progress toward the discharge end than through the cleanout passages 104 alone—as in the Mixing/Drying Phase.

Figure 8:
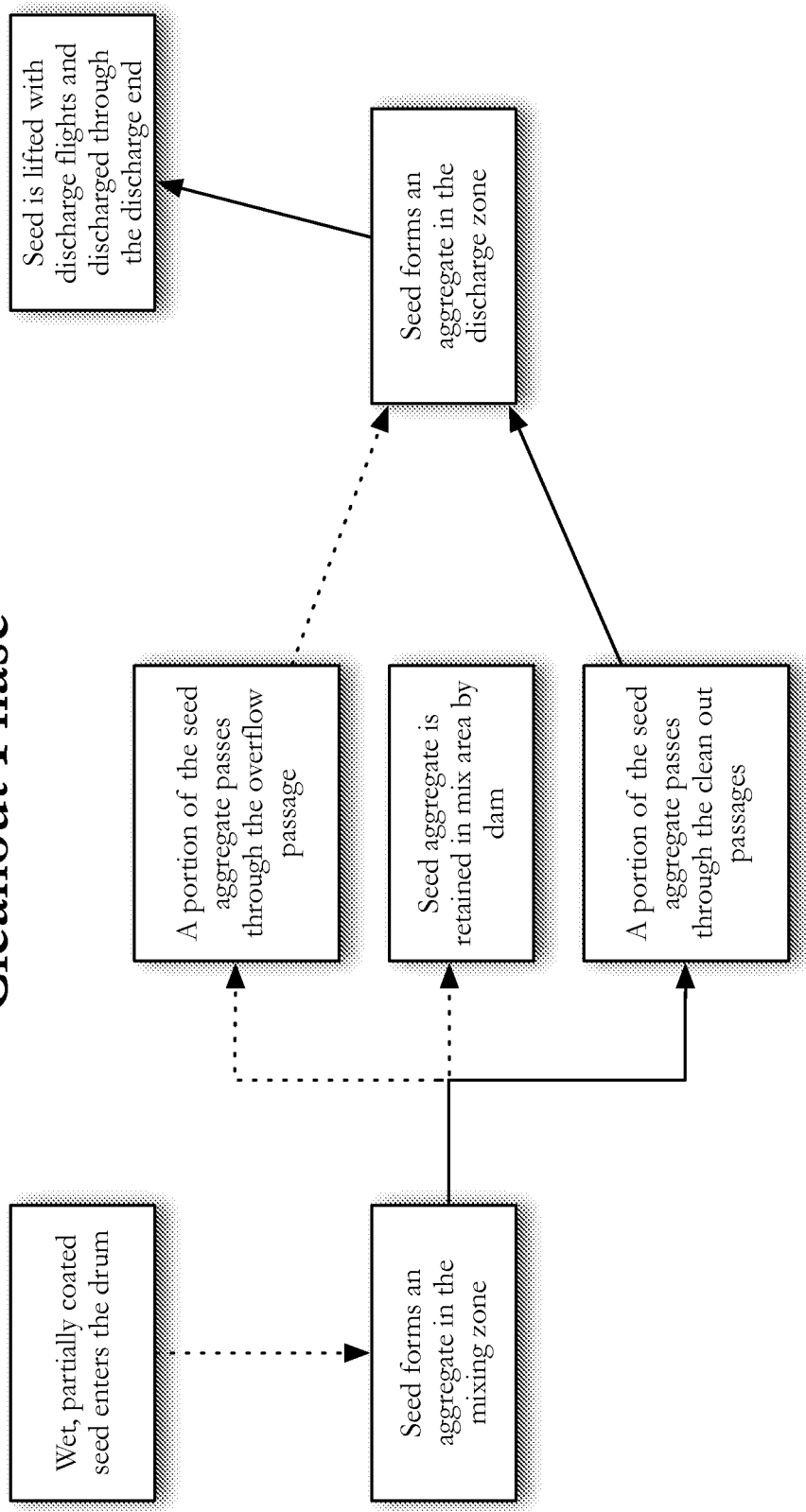
FIG. 8 is a flow chart depicting the progression of seed through the rotating drum during the cleanout phase.

FIG. 8 depicts the Cleanout Phase. At the end of a treatment cycle, treated seed no longer enters the drum 10. It is important that the drum is cleaned out rapidly and completely. As the seed aggregate diminishes in size, the retaining portion 110 of the dam 10 no longer retains a portion of the seed. The seed is permitted to flow through the cleanout passages 104 and be discharged.

One additional problem with existing rotating drums is that wet, freshly treated seed often sticks to the interior surface 80, which requires the operator to perform a difficult cleaning process. The rotating drum can be more easily cleaned if a portion of the discharge end wall 44 is separate from the drum cylinder 40. In this embodiment, the discharge end wall 44 is mounted to the drum frame 12 such that the discharge end wall 44 is stationary and does not rotate with the drum. The discharge end wall 44—or a portion thereof—can be hinged, to allow the operator access to the interior of the drum 10. Alternatively, the discharge end wall 44—or a portion thereof—can slide or rotate out of the way, providing the operator greater access to the interior of the drum. In order to provide a tight seal between the rotating drum cylinder 40 and the stationary discharge end wall 44, a layer of ultra-high-molecular-weight polyethylene would provide a low friction and high durability point of contact.

The chute 34 can have a chute hinge 36. The chute hinge 36 allows the portion of the chute that extends past the chute supports 38 to fold upward toward the drum 10. Folding the chute 34 allows the drum to be stored when not in use. Folding the chute 34 also allows for transporting the drum without damaging the chute. Folding the chute 34 also allows for easier maneuvering the discharge conveyor into the proper position to receive seed discharged from the drum.

It is understood that the invention is not confined to the particular construction and arrangement of parts herein described. That although the drawings and specification set forth a preferred embodiment, and although specific terms are employed, they are used in a description sense only and embody all such forms as come within the scope of the following claims.

In the Summary above, the Detailed Description, and in the accompanying drawings, reference is made to particular features including method steps of the invention. The reader should understand that the disclosure of the invention in this specification includes all possible combinations of such particular features. For example, where a particular feature is disclosed in the context of a particular aspect or embodiment of the invention, or a particular claim, that feature can also be used, to the extent possible, in combination with and/or in the context of other particular aspects and embodiments of the invention, and in the invention generally. It is understood that the invention is not confined to the particular construction and arrangement of parts herein described. That although the drawings and specification set forth a preferred embodiment, and although specific terms are employed, they are used in a description sense only and embody all such forms as come within the scope of the following claims.

The term "comprises" and its grammatical equivalents are used in this document to mean that other components, steps, etc. are optionally present. For example, an article "comprising" or "which comprises" components A, B, and C can consist of components A, B, and C, or can contain not only components A, B, and C but also one or more other components.

The invention claimed is:

1. A horizontal rotating drum for mixing and drying seed, comprising a dam attached to an interior surface of the drum and rotating with the drum, where the dam is a solid annular ring impermeable to the seed except for one or more cleanout passages located adjacent to the interior surface of the drum and an overflow passage centrally disposed within the dam thereby separating the drum into separate zones, wherein each zone is configured to lift the seed to dry the seed by exposing the seed to air.

2. A method for mixing and drying a treated agricultural seed, the method comprising the steps of:
   a. depositing the treated agricultural seed into a drum with a first zone configured with mixing flights, the drum having an interior surface;
   b. transferring the treated agricultural seed into a second zone configured with drying flights and subsequently into a third zone configured for discharging the treated agricultural seed;
   c. selectively limiting the progression of seed transfer from the first zone to the second zone with a first partial dam configured to intermittently prohibit seed progression as the drum rotates, the first partial dam comprising a solid annular ring with an inner circumference and an outer circumference with a plurality of cleanout apertures through the solid annular ring along the outer circumference;
   d. drying the treated agricultural seed throughout the movement of the treated agricultural seed through the drum by lifting the treated agricultural seed and exposing the treated agricultural seed to the air; and e. discharging the treated agricultural seed from the drum.

3. The method of claim 2 wherein the first partial dam comprises:
   a. a plurality of peripheral apertures evenly distributed about the interior surface of the drum;
   b. a central aperture defining an overflow passage; and
   c. an annular retaining portion positioned between the plurality of cleanout apertures and the overflow passage.

4. The method of claim 2, further comprising:
   a. lifting the treated agricultural seed with a plurality of mixing flights, the plurality of mixing flights extending longitudinally and mounted at a distance above the interior surface of the drum.

5. A horizontal mixing drum for mixing and drying of wet agricultural seed partially coated with a treatment fluid, the horizontal mixing drum comprising:
   a. a drum that is elongated and hollow with an inlet end and a discharge end, where the drum is rotated about a central longitudinal axis;
      i. an inlet aperture in the inlet end for receiving seed;
      ii. a discharge aperture in the discharge end for discharging seed;
   b. a mixing zone at the inlet end that receives wet seed and has a plurality of mixing flights raised off an interior surface of the drum defining a gap between each of the plurality of mixing flights and the interior surface of the drum;
   c. a discharge zone at the discharge end that discharges seed and has a plurality of discharge flights;
   d. a drying zone between the mixing zone and the discharge zone, configured with a plurality of drying flights;
   e. a first dam disposed between the mixing zone and the drying zone selectively retards the progression of seed, the first dam is attached to the interior surface of the drum, rotates with the drum, and has:
      i. at least one peripheral aperture defining a cleanout passage disposed adjacent to the interior surface of the drum;
      ii. a central aperture defining an overflow passage; and
      iii. a retaining portion positioned between the cleanout passage and the overflow passage.

6. The horizontal mixing drum of claim 5 wherein the drying zone is further configured with a plurality of helical flights that encourage seed toward the discharge end as the drum rotates.

7. The horizontal mixing drum of claim 6 wherein the helical flights are attached to the interior surface of the drum without a gap underneath and extend longitudinally within the drum, and wherein the helical flights are shorter than the cleanout passage.

8. The horizontal mixing drum of claim 5 wherein the discharge zone is further configured with a plurality of lifting flights that elevate the seed onto a discharge chute that is disposed within an aperture of the discharge end.

9. The horizontal mixing drum of claim 5 further comprising a control system that controls the speed of rotation of the drum wherein the control system causes the drum to turn at a reduced rate for a set amount of time and then increases the rate to full speed.

10. The horizontal mixing drum of claim 5, wherein each of the plurality of mixing flights further comprise:
    a. a flat bar extending longitudinally through the mixing zone.

11. The horizontal mixing drum of claim 5, wherein the plurality of drying flights further comprise:
    a. a round bar extending longitudinally through the drying zone, the round bar raised off the interior surface of the drum defining a gap between each of the drying flights and the interior surface of the drum.

12. The horizontal mixing drum of claim 10, wherein the drying zone further comprises:
    a. a plurality of helical cleanout flights attached to the interior surface of the drum without a gap underneath and extend longitudinally within the drum, wherein the helical cleanout flights are shorter than the cleanout passage.

13. An agricultural seed treatment system for applying, evenly distributing, and drying a treatment fluid to coat a flow of an agricultural seed, the agricultural seed treatment system comprising:
    a. a seed treatment applicator that applies the treatment fluid to a flow of seed;
    b. a horizontal mixing drum that is elongated and hollow with an inlet end and a discharge end, where the horizontal mixing drum is rotated about a central longitudinal axis, the horizontal mixing drum further comprising:
        i. an inlet aperture in the inlet end for receiving the flow of seed from the seed treatment applicator whereby the seed that accumulates in an interior of the horizontal mixing drum forms an aggregate of treated seed;
        ii. a first dam attached to the interior of the horizontal mixing drum that rotates with the drum, the first dam dividing the horizontal mixing drum into multiple zones wherein each of the multiple zones is configured to dry the agricultural seed, the first dam has:
            at least one peripheral aperture defining a cleanout passage disposed adjacent to the interior of the horizontal mixing drum;
            a central aperture defining an overflow passage;
            a retaining portion positioned between the cleanout passage and the overflow passage; and
        iii. whereby the first dam selectively limits the progression of the aggregate of treated seed toward the discharge end such that:
            a first portion of the aggregate of treated seed that is shorter than the peripheral aperture will progress through the cleanout passage;
            a second portion of the aggregate of treated seed that accumulates to the height of the central aperture will progress through the overflow passage; and
            a third portion of the aggregate of treated seed is retained.

14. The agricultural seed treatment system of claim 13, wherein the first dam is an annular ring.

* * * * *